(12) United States Patent
Jun et al.

(10) Patent No.: US 12,250,331 B2
(45) Date of Patent: Mar. 11, 2025

(54) DUAL CAMERA MODULE STRUCTURE WITH ADJUSTABLE ANGLE OF VIEW

(71) Applicant: SAMSUNG ELECTRO-MECHANICS CO., LTD., Suwon-si (KR)

(72) Inventors: Jae Woo Jun, Suwon-si (KR); Yun Kyoung Choi, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 233 days.

(21) Appl. No.: 17/982,870

(22) Filed: Nov. 8, 2022

(65) Prior Publication Data
US 2023/0208957 A1  Jun. 29, 2023

(30) Foreign Application Priority Data

Dec. 27, 2021  (KR) .......... 10-2021-0188003

(51) Int. Cl.
*H04M 1/02* (2006.01)
*G03B 17/56* (2021.01)
*H04N 23/57* (2023.01)

(52) U.S. Cl.
CPC ........ *H04M 1/0264* (2013.01); *G03B 17/561* (2013.01); *H04N 23/57* (2023.01)

(58) Field of Classification Search
CPC ... H04M 1/0264; G03B 17/561; G03B 30/00; H04N 23/57
See application file for complete search history.

(56) References Cited

U.S. PATENT DOCUMENTS

| | | | |
|---|---|---|---|
| 5,949,477 A * | 9/1999 | Hoglin | H04N 13/239 348/42 |
| 6,701,081 B1 * | 3/2004 | Dwyer | G03B 41/00 396/329 |
| 2002/0044202 A1 | 4/2002 | Lee et al. | |
| 2013/0033584 A1 | 2/2013 | Seo et al. | |

(Continued)

FOREIGN PATENT DOCUMENTS

| CN | 112822415 A | 5/2021 |
|---|---|---|
| JP | 2010-245831 A | 10/2010 |
| KR | 10-2002-0018331 A | 3/2002 |

(Continued)

OTHER PUBLICATIONS

Translation of KR20170057058A, Kim et al. (Year: 2017).*

(Continued)

*Primary Examiner* — Nicholas G Giles
(74) *Attorney, Agent, or Firm* — NSIP Law (57) ABSTRACT

A camera module includes: a fixing member; a base member slidably coupled to the fixing member; a driving unit coupled to the base member and including a main gear; a gear structure rotatably coupled to the base member to engage with the main gear; a first camera connected to the gear structure to be rotated; and a second camera connected to the gear structure to be rotated in a direction opposite to the first camera. A first position of the base member when the main gear is rotated in a first rotation direction is different from a second position of the base member when the main gear is rotated in a second rotation direction that is opposite to the first rotation direction.

15 Claims, 12 Drawing Sheets

(56) References Cited

U.S. PATENT DOCUMENTS

2021/0337050 A1    10/2021   Jun et al.

FOREIGN PATENT DOCUMENTS

| KR | 10-2011-0114057 A | 10/2011 | | |
|---|---|---|---|---|
| KR | 10-2017-0057058 A | 5/2017 | | |
| KR | 20170057058 A | * 5/2017 | ............. | H04M 1/02 |
| KR | 10-2300017 B1 | 9/2021 | | |

OTHER PUBLICATIONS

Korean Office Action issued on Jul. 21, 2023, in counterpart Korean Patent Application No. 10-2021-0188003 (6 pages in English, 4 pages in Korean).

* cited by examiner

DUAL CAMERA MODULE STRUCTURE WITH ADJUSTABLE ANGLE OF VIEW

CROSS-REFERENCE TO RELATED APPLICATION(S)

This application claims the benefit under 35 USC 119(a) of priority to Korean Patent Application No. 10-2021-0188003 filed on Dec. 27, 2021 in the Korean Intellectual Property Office, the entire disclosure of which is incorporated herein by reference for all purposes.

BACKGROUND

1. Field

The following description relates to a camera module.

2. Description of Background

A camera module has been basically provided in portable electronic devices such as smartphones, tablet PCs, and notebook computers.

Furthermore, in order to obtain various effects that are difficult to implement with a single camera, a structure in which a plurality of cameras is disposed in a portable electronic device, rather than a single camera has been proposed.

However, since the positions of the plurality of cameras are generally fixed, there may be a limit in realizing various effects, even when a plurality of cameras are disposed in the portable electronic device.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a fixing member; a base member slidably coupled to the fixing member; a driving unit coupled to the base member and including a main gear; a gear structure rotatably coupled to the base member and configured to engage with the main gear; a first camera connected to the gear structure and configured to be rotated; and a second camera connected to the gear structure and configured to be rotated in a direction opposite to the first camera. A first position of the base member when the main gear is rotated in a first rotation direction is different from a second position of the base member when the main gear is rotated in a second rotation direction that is opposite to the first rotation direction.

When the main gear is rotated in the first rotation direction, the base member may be configured to maintain a fixed state with respect to the fixing member, and when the main gear is rotated in the second rotation direction, the base member may be configured to be slidably moved with respect to the fixing member.

When the main gear is rotated in the first rotation direction, the first camera and the second camera may each be configured to be relatively rotated with respect to the base member, and when the main gear is rotated in the second rotation direction, the first camera and the second camera may each be configured to be relatively rotated with respect to the base member, and the base member may be configured to be slidably moved with respect to the fixing member.

The fixing member may include a first support member extending to face a lower surface of the first camera and a second support member extending to face a lower surface of the second camera, a first protruding portion protruding toward the first support member may be disposed on the lower surface of the first camera, and a second protruding portion protruding toward the second support member may be disposed on the lower surface of the second camera.

When the main gear is rotated in the first rotation direction, the first protruding portion and the second protruding portion may be respectively moved in a direction away from the fixing member, and when the main gear is rotated in the second rotation direction, the first protruding portion and the second protruding portion may be in contact with the fixing member.

The camera module may include an elastic member having a first end connected to the base member and a second end connected to the fixing member, and when the main gear is rotated in the second rotation direction, the elastic member may be elastically deformed.

The first protruding portion and the second protruding portion may each have a convex curved surface.

The first protruding portion may be disposed at an outer end of the lower surface of the first camera in a direction away from the gear structure, and the second protruding portion may be disposed at an outer end of the lower surface of the second camera in a direction away from the gear structure.

The base member may include a guide groove, and the fixing member may include a guide protrusion configured to be inserted into the guide groove.

The gear structure may include a connection gear, a first sub-gear, a second sub-gear, and a third sub-gear, the connection gear may be engaged with the main gear, the first sub-gear and the second sub-gear may be engaged with the connection gear, and the third sub-gear may be engaged with the second sub-gear.

The gear structure may include a connection gear, which is engaged with the main gear, and a first sub-gear, a second sub-gear, and a third sub-gear, which are each engaged with the connection gear directly or indirectly, a rotational direction of the connection gear and a rotational direction of the first sub-gear and the second sub-gear may be opposite to each other, and the rotational direction of the connection gear and a rotational direction of the third sub-gear may be the same.

The first camera may be connected to the first sub-gear, and the second camera may be connected to the third sub-gear.

When the main gear is rotated in the first rotation direction, the first camera and the second camera may be rotated so that an optical axis of the first camera and an optical axis of the second camera intersect each other in a direction toward a subject.

When the main gear is rotated in the second rotation direction, the first camera and the second camera may be rotated so that the optical axis of the first camera and the optical axis of the second camera intersect each other in a direction away from the subject.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Hereinafter, various examples will be described in detail with reference to the accompanying drawings. The various examples may, however, be exemplified in many different forms and should not be construed as being limited to the specific examples set forth herein.

Figure 1:
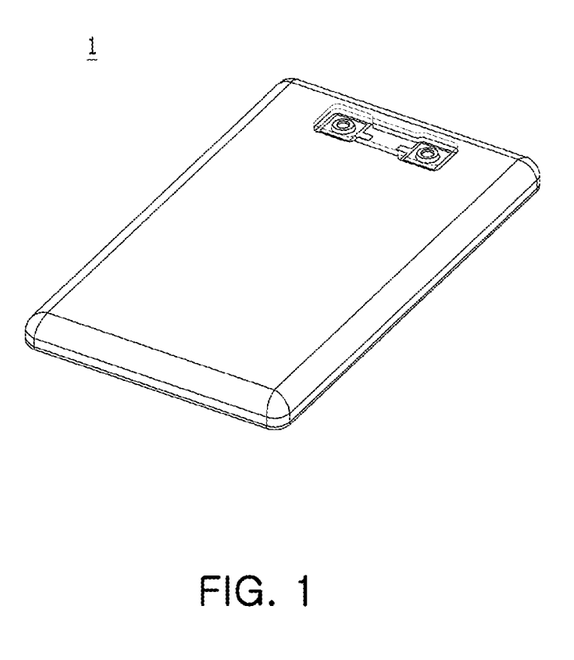
FIG. 1 is a perspective view of a portable electronic device according to an example.
Figure 2:
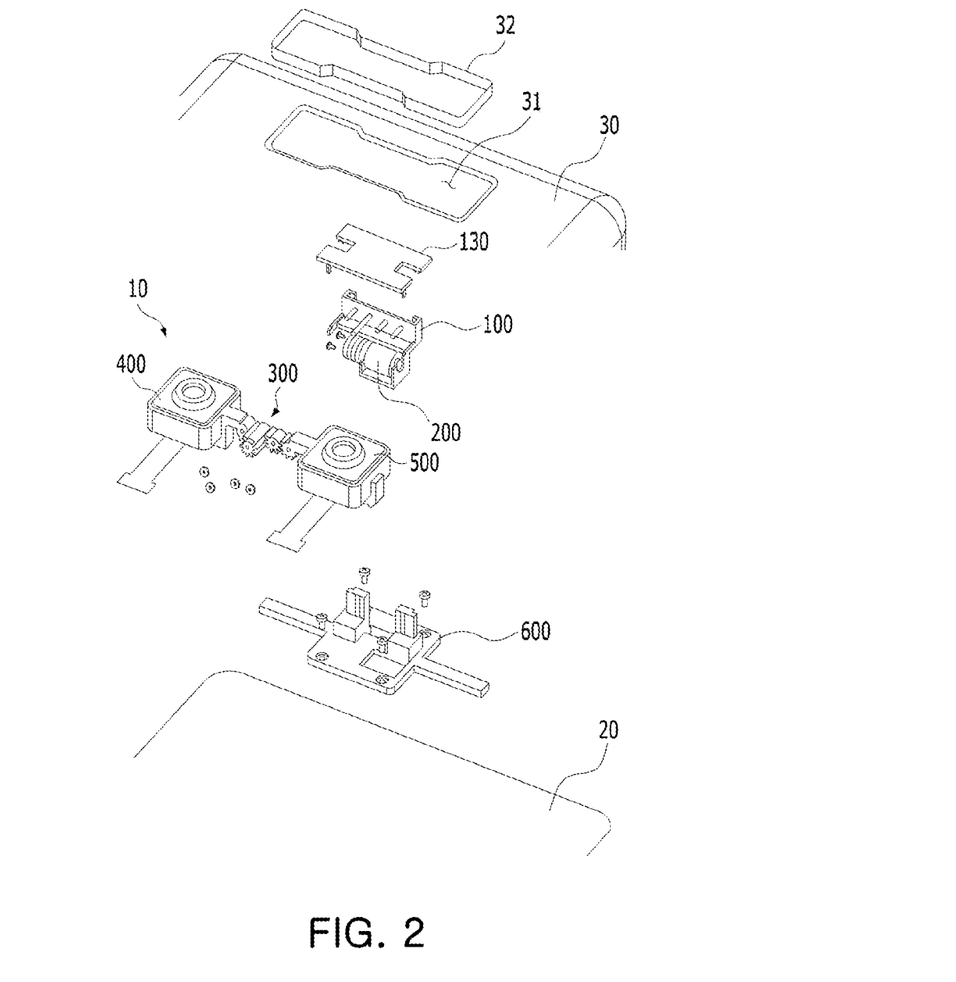
FIG. 2 is a schematic exploded perspective view of a portable electronic device and a camera module according to an example.

FIG. 1 is a perspective view of a portable electronic device according to an example, and FIG. 2 is a schematic exploded perspective view of a portable electronic device and a camera module according to an example.

A portable electronic device 1 may be a portable electronic device such as a mobile communication terminal, a smartphone, a tablet PC, or the like.

Referring to FIGS. 1 and 2, the portable electronic device 1 includes a case 20, a cover 30, and a camera module 10.

The case 20 and the cover 30 form an exterior of the portable electronic device 1, and the camera module 10 is disposed in an internal space of the portable electronic device 1 formed by the case 20 and the cover 30.

The cover 30 of the portable electronic device 1 is provided with an opening 31 so that light is incident on the camera module 10. A cover glass 32 is disposed in the opening 31.

The cover glass 32 may seal the opening 31. Accordingly, it is possible to prevent an external foreign object from being introduced into an internal space of the portable electronic device 1.

The camera module 10 includes a plurality of cameras. For example, the camera module 10 includes a first camera 400 and a second camera 500 configured to image a subject individually, respectively. Each of the first camera 400 and the second camera 500 includes at least one lens and an image sensor.

Each of the plurality of cameras may have an optical axis, and may be rotatably disposed.

For example, the plurality of cameras may be rotated in opposite directions together with each other. Accordingly, optical axes of the plurality of cameras may be selectively positioned to be in parallel with each other or in a direction intersecting each other.

For example, when the first camera 400 is rotated clockwise, the second camera 500 may be rotated counterclockwise. Conversely, when the first camera 400 is rotated counterclockwise, the second camera 500 may be rotated clockwise.

Accordingly, an optical axis of the first camera 400 (hereinafter, referred to as a 'first optical axis') and an optical axis of the second camera 500 (hereinafter referred to as a 'second optical axis') may change positions depending on an imaging mode.

For example, the first camera 400 and the second camera 500 may be rotated so that the first optical axis and the second optical axis intersect in a direction toward a subject. The first camera 400 and the second camera 500 may be rotated so that the first optical axis and the second optical axis intersect in a direction opposite to the direction toward the subject.

The first camera 400 and the second camera 500 may be rotated together with a gear structure 300. The gear structure 300 may be connected to a driving unit 200 to receive driving force.

The driving unit 200 may be a motor having a gear.

Figure 3A:
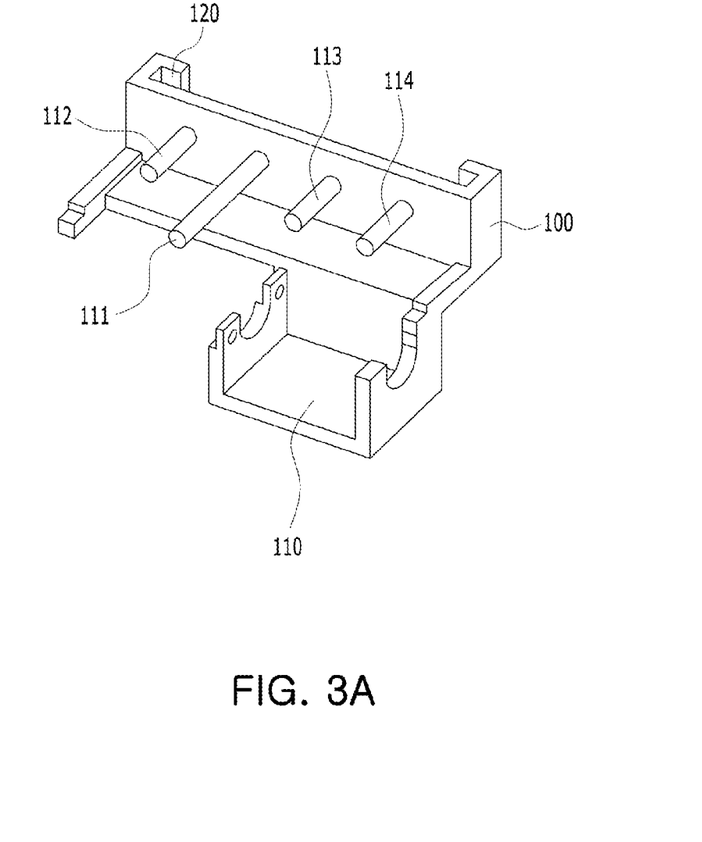
FIGS. 3A and 3B are perspective views illustrating a state in which a driving unit is coupled to a base member.
Figure 3B:
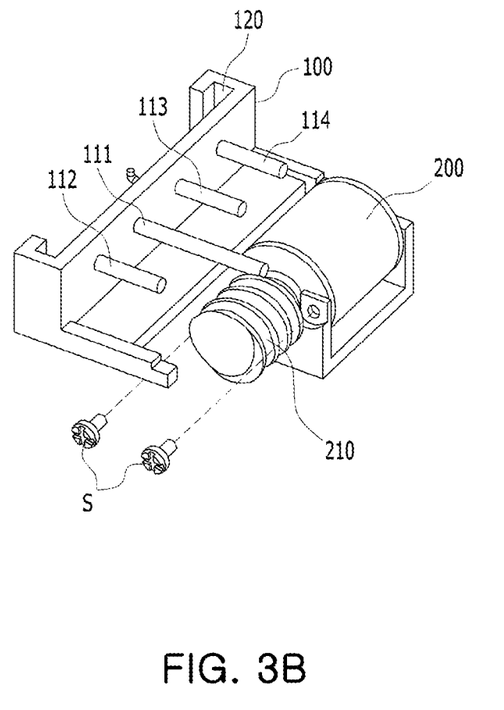

Referring to FIGS. 3A and 3B, a state in which the driving unit 200 is coupled to a base member 100 is illustrated.

The driving unit 200 is fixedly coupled to the base member 100. The base member 100 is provided with a fixing unit 110 in which the driving unit 200 is disposed, the driving unit 200 may be disposed in the fixing unit 110, and the driving unit 200 may be fixed to the fixing unit 110 by at least one screw S.

Driving force of the driving unit 200 may be transmitted to each camera by the gear structure 300. Accordingly, a main gear 210 (e.g., a worm gear) of the driving unit 200 may be engaged with the gear structure 300. That is, the gear structure 300 may be directly or indirectly engaged with the main gear 210 of the driving unit 200.

A plurality of shafts, which are rotation shafts of the gear structure 300, are disposed on the base member 100.

For example, a first shaft 111, a second shaft 112, a third shaft 113, and a fourth shaft 114 are disposed on the base member 100.

The second shaft 112 and the third shaft 113 are disposed in a position, adjacent to the first shaft 111. For example, the second shaft 112 and the third shaft 113 may be disposed on both sides of the first shaft 111, respectively. Accordingly, the first shaft 111 is positioned between the second shaft 112 and the third shaft 113.

The fourth shaft 114 is disposed in a position, adjacent to the third shaft 113. That is, the first shaft 111 and the fourth shaft 114 may be disposed on both sides of the third shaft 113. Accordingly, the third shaft 113 is positioned between the first shaft 111 and the fourth shaft 114.

Figure 4:
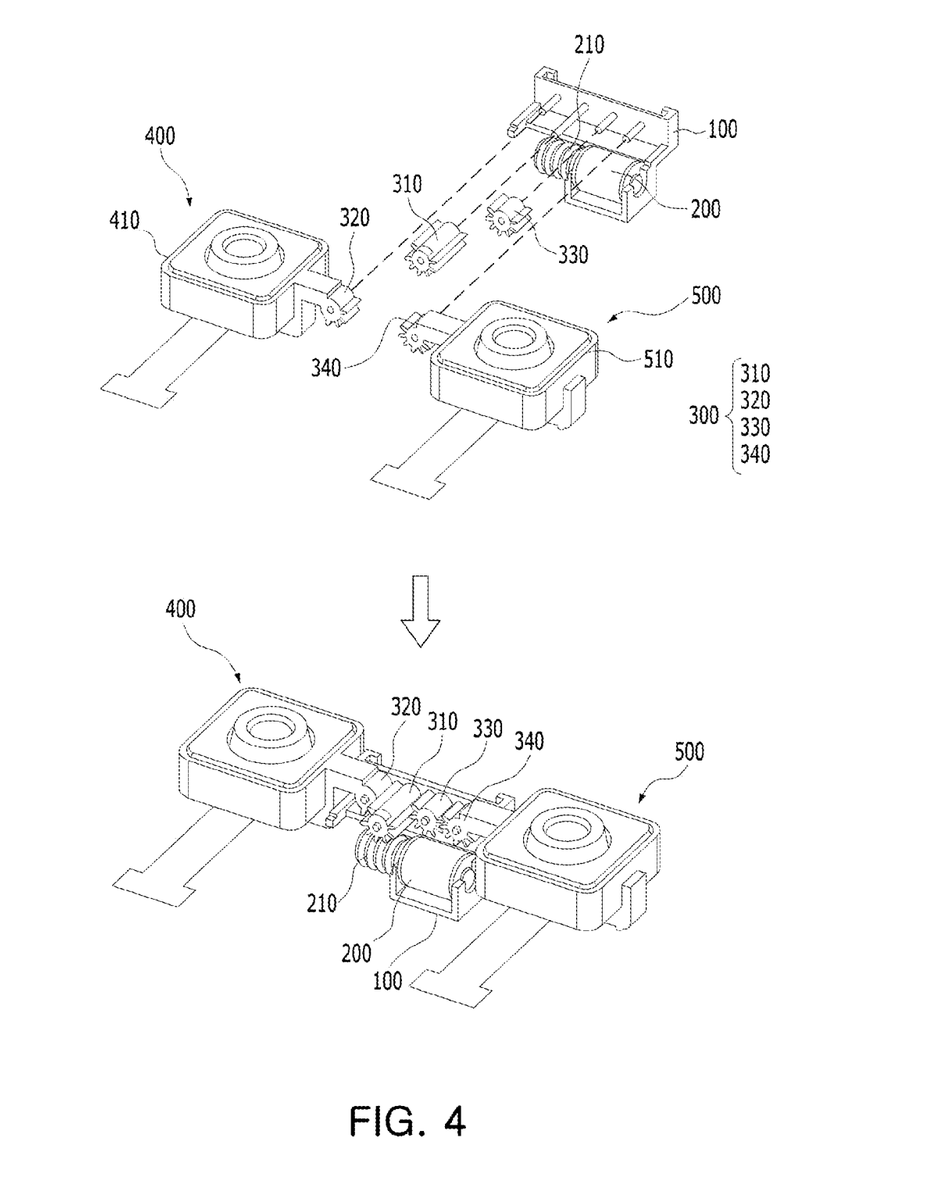
FIGS. 4 and 5 are perspective views illustrating a state in which a gear structure and a plurality of cameras are coupled to a base member.

Referring to FIG. 4, the gear structure 300 is inserted into the plurality of shafts of the base member 100.

The gear structure 300 is configured to transmit driving force of the driving unit 200 to each camera. For example, the first camera 400 and the second camera 500 may be rotated in opposite directions by the gear structure 300.

In an example, the gear structure 300 includes a connection gear 310, a first sub-gear 320, a second sub-gear 330, and a third sub-gear 340.

The connection gear 310 is disposed on the first shaft 111, and the connection gear 310 is engaged with a gear of the driving unit 200. Accordingly, the connection gear 310 may be rotated using the first shaft 111 as a rotation shaft.

The first sub-gear 320 is disposed on the second shaft 112, and disposed in a position adjacent to the first shaft 111. The first sub-gear 320 may be engaged with the connection gear 310 and may be rotated using the second shaft 112 as a rotation shaft.

The first sub-gear 320 may be configured to be fixed to the first camera 400. In an example, the first camera 400 may be coupled to a first gear case 410 having the first sub-gear 320. As another example, the first sub-gear 320 may be disposed directly on the first camera 400.

The second sub-gear 330 is disposed on the third shaft 113, and disposed in a position adjacent to the first shaft 111. The second sub-gear 330 may be engaged with the connection gear 310 and may be rotated using the third shaft 113 as a rotation shaft.

The third sub-gear 340 is disposed on a fourth shaft 114, and disposed in a position adjacent to the third shaft 113. The third sub-gear 340 may be engaged with the second sub gear 330 and may be rotated using the fourth shaft 114 as a rotation shaft.

The third sub-gear 340 may be configured to be fixed to a second camera 500. In an example, the second camera 500 may be coupled to a second gear case 510 having the third sub-gear 340. As another example, the third sub-gear 340 may be disposed directly on the second camera 500.

A rotational direction of the first sub-gear 320 and a rotational direction of the second-sub gear 330 may be the same. In addition, a rotational direction of the second sub-gear 330 and a rotational direction of the third sub-gear 340 may be opposite to each other. Accordingly, the first camera 400, connected to the first sub-gear 320, and the second camera 500, connected to the third sub-gear 340, may be rotated in opposite directions.

For example, when the first camera 400 is rotated clockwise, the second camera 500 may be rotated counterclockwise, and when the first camera 400 is rotated counterclockwise, the second camera 500 may be rotated clockwise.

Figure 5:
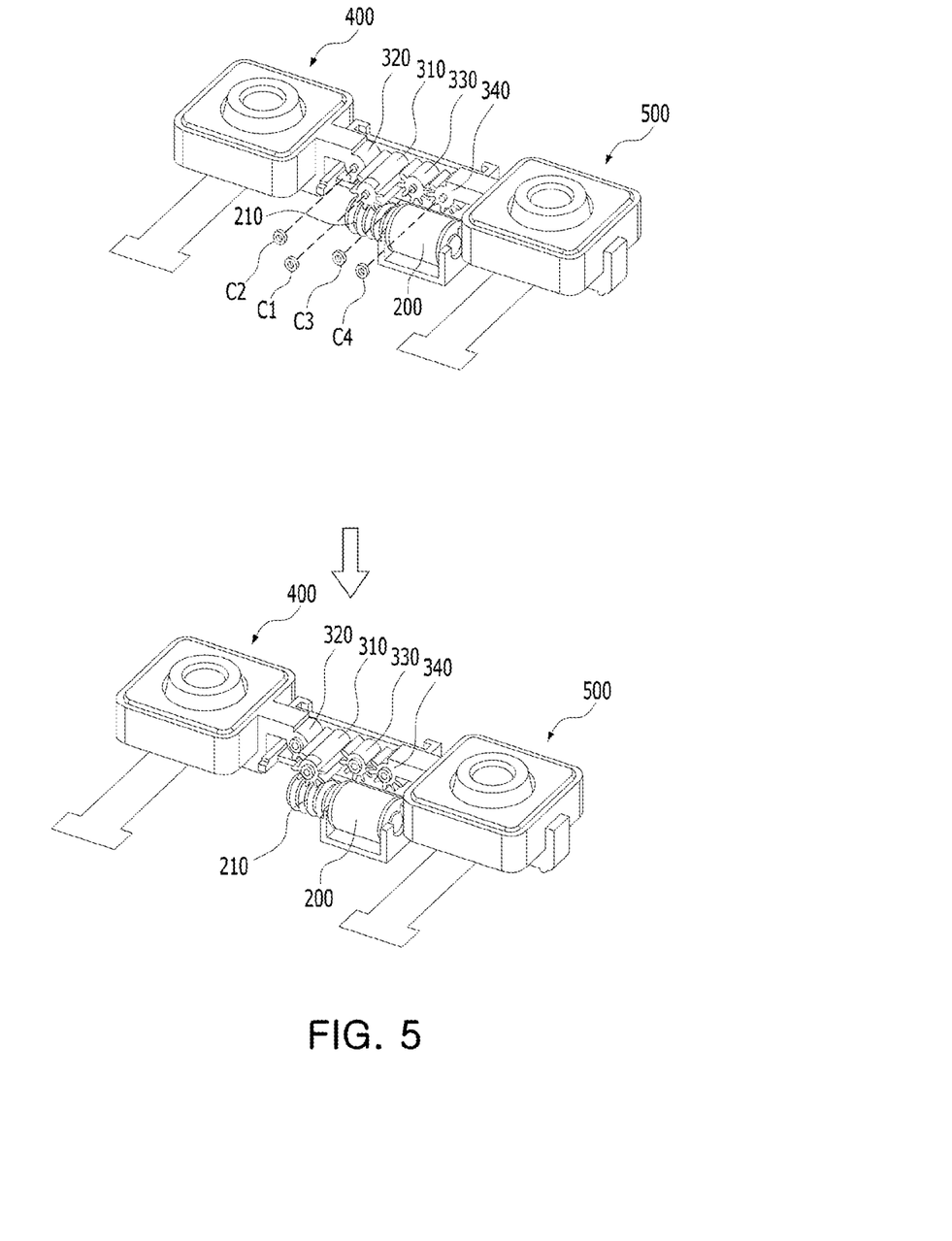

Referring to FIG. 5, when the gear structure 300 is inserted into each shaft, caps C1, C2, C3, and C4 are coupled to ends of each shaft. Accordingly, it is possible to prevent the gear structure 300 from being separated from each shaft, and the gear structure 300 may be stably rotated.

Figure 6:
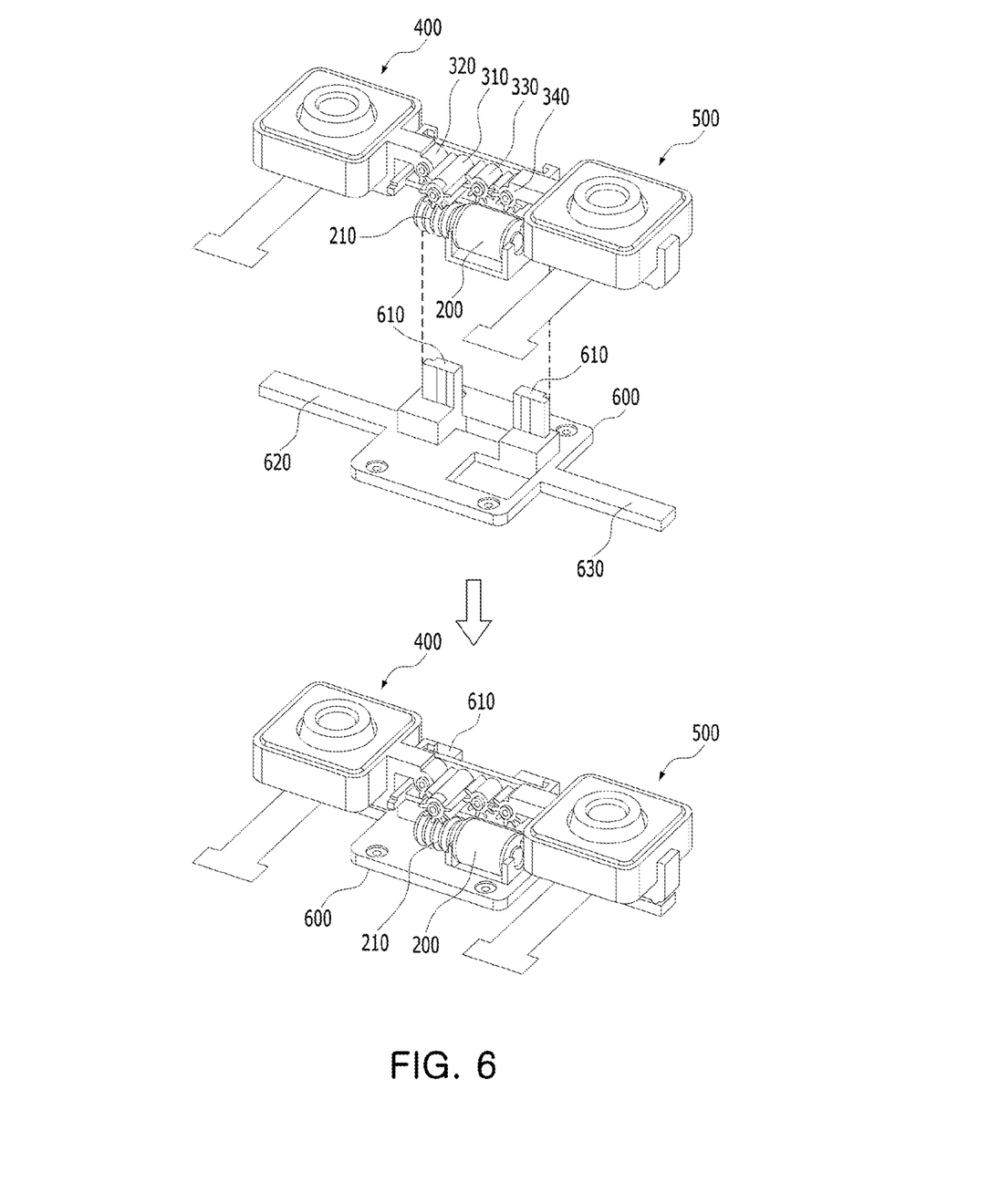
FIGS. 6 and 7 are perspective views illustrating a state in which a base member, a gear structure, and a plurality of cameras are coupled to a fixing member.
Figure 7:
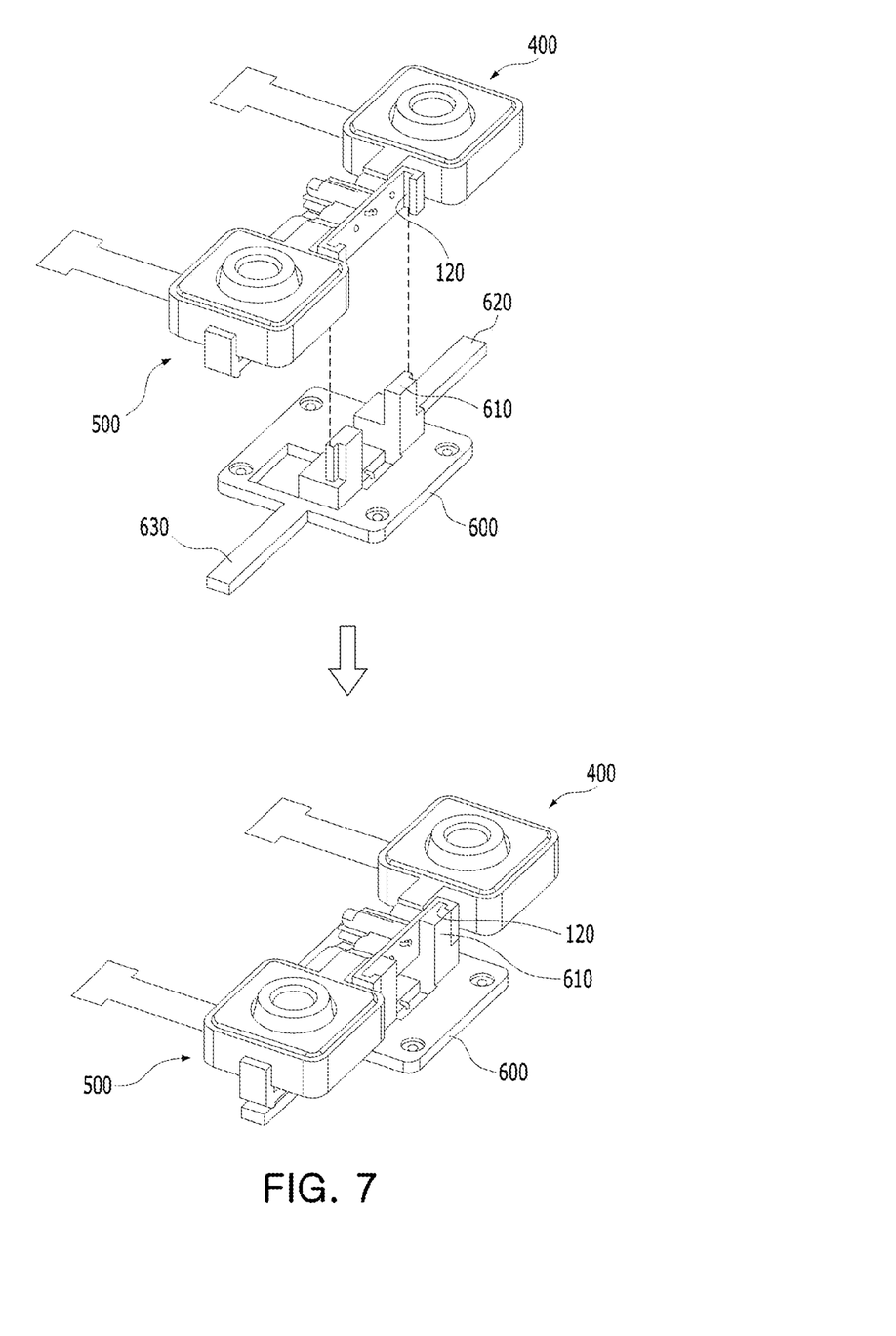

Referring to FIGS. 6 and 7, a state in which a base member to which the first camera 400 and the second camera 500 are coupled is coupled to a fixing member 600 is illustrated.

The base member 100 is slidably coupled to the fixing member 600. In an example, one of the base member 100 and the fixing member 600 is provided with a guide groove 120, and the other one thereof is provided with a guide protrusion 610.

FIGS. 6 and 7 illustrate an example in which the guide groove 120 is provided on the base member 100 and the guide protrusion 610 is provided on the fixing member 600 for convenience of explanation.

A first support member 620 and a second support member 630 are disposed on the fixing member 600. The first support member 620 extends to face a lower surface of the first camera 400, and the second support member 630 extends to face a lower surface of the second camera 500.

Figure 8:
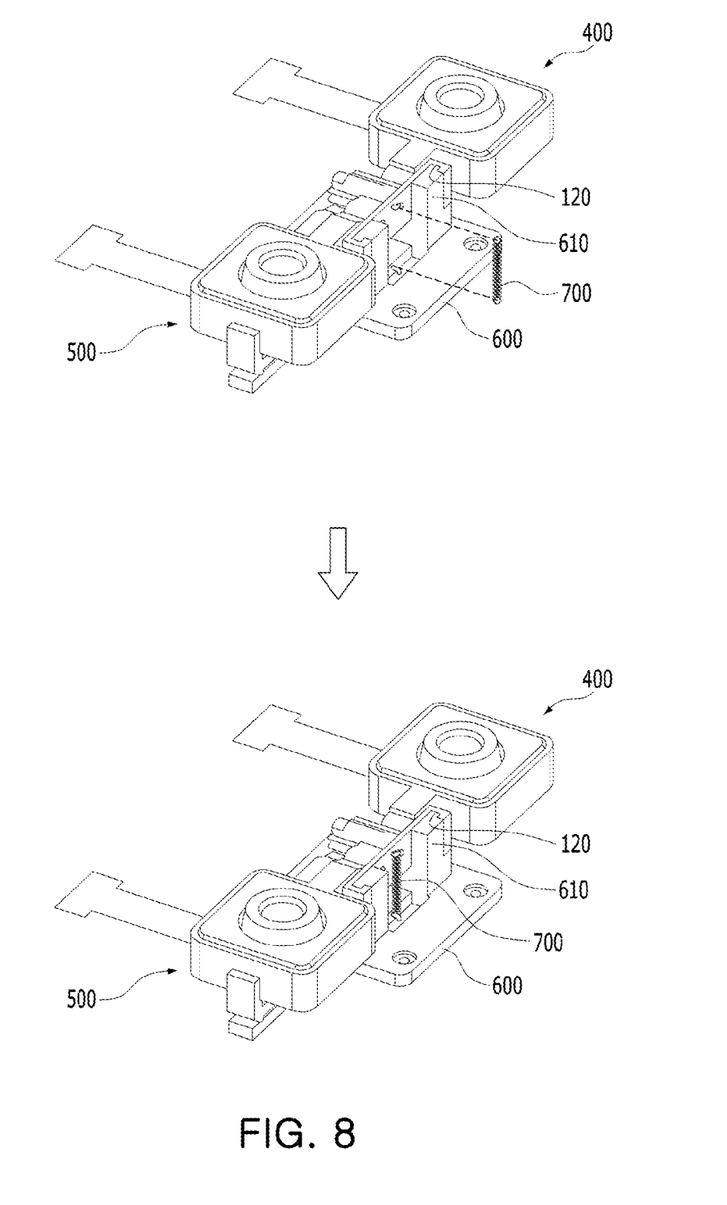
FIG. 8 is a perspective view illustrating a state in which an elastic member for elastically supporting a base member is assembled.
Figure 9:
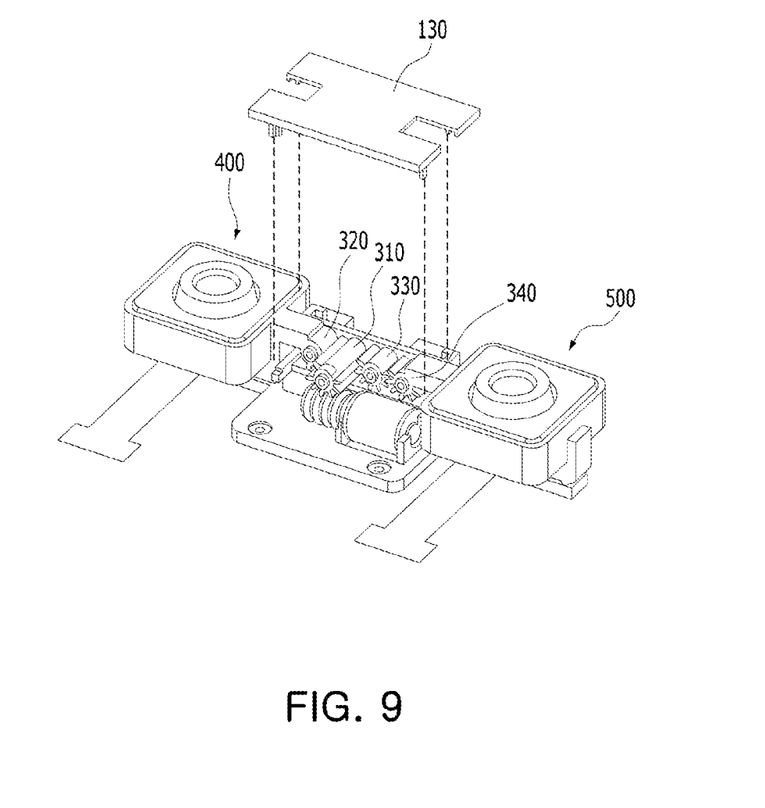
FIG. 9 is a perspective view illustrating a state in which a cover member is coupled to a base member.

Referring to FIGS. 8 and 9, an elastic member 700 connected to the base member 100 and the fixing member 600 is illustrated.

One end of the elastic member 700 is connected to the base member 100, and the other end of the elastic member 700 is connected to the fixing member 600.

Accordingly, when the base member 100 is slidably moved with respect to the fixing member 600, the elastic member 700 may be elastically deformed to support the base member 100.

In addition, a cover member 130 may be coupled to the base member 100 so as to cover the gear structure 300.

Figure 10:
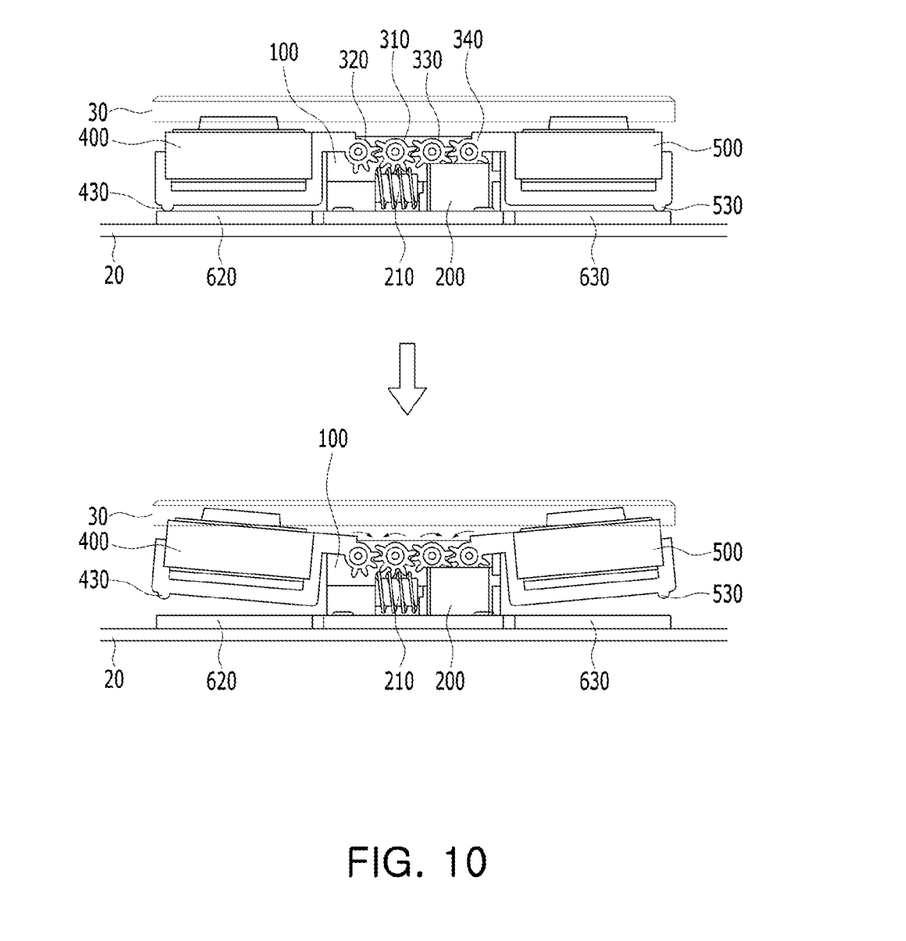
FIGS. 10 and 11 are views illustrating a state in which a first camera and a second camera of the camera module are rotated according to an example.
Figure 11:
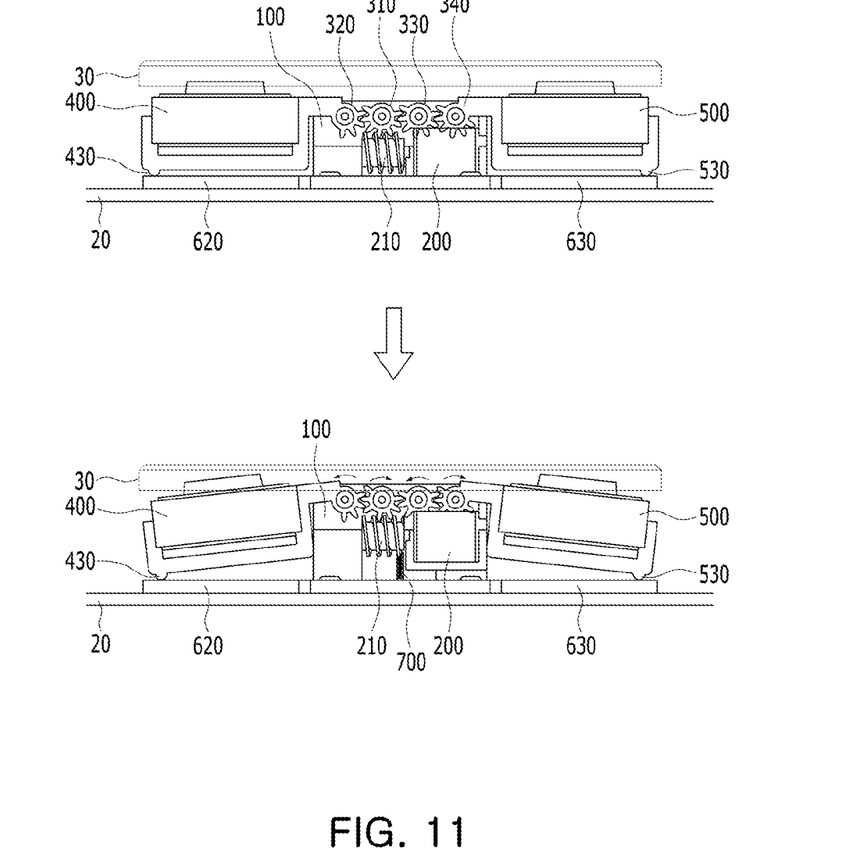

FIGS. 10 and 11 are views illustrating a state in which the first camera and the second camera of the camera module are rotated according to an example.

Referring to FIG. 10, when power is applied to a driving unit 200 and the main gear 210 is rotated in one direction, the connection gear 310, engaged with the main gear 210, is rotated in one direction (e.g., counterclockwise).

The first sub-gear 320 and the second sub-gear 330, engaged with the connection gear 310, are respectively rotated in an opposite direction to the connection gear 310 (e.g., clockwise).

The third sub-gear 340, engaged with the second sub-gear 330, is rotated in an opposite direction to the second sub-gear 330 (e.g., counterclockwise).

Since the first sub-gear 320 is connected to the first camera 400 and the third sub-gear 340 is connected to the second camera 500, the first camera 400 and the second camera 500 are rotated in opposite directions.

For example, the first camera 400 is rotated clockwise, and the second camera 500 is rotated counterclockwise.

Therefore, the first camera 400 and the second camera 500 may be rotated so that a first optical axis O1 and a second optical axis O2 intersect in a direction toward a subject. Accordingly, it is possible to narrow an imaging range through the two cameras.

When the main gear 210 is rotated in one direction, the first camera 400 and the second camera 500 are relatively rotated with respect to a base member 100, respectively, and the base member 100 is configured to maintain a fixed state with respect to the fixing member 600. That is, a position of the base member 100 before and after the main gear 210 rotates in one direction does not change.

Meanwhile, referring to FIG. 10, a first protruding portion 430 is disposed on the first camera 400, and the second protruding portion 530 is disposed on the second camera 500.

For example, the first protruding portion 430 is disposed on a lower surface of the first camera 400 and protrudes toward the first support member 620. The second protruding portion 530 is disposed on a lower surface of the second camera 500 and protrudes toward the second support member 630.

Each of the first protruding portion 430 and the second protruding portion 530 may have a convex curved surface.

When the first camera 400 is rotated clockwise and the second camera 500 is rotated counterclockwise, the first protruding portion 430 and the second protruding portion 530 move in a direction, away from a fixing member 600, respectively. That is, the first protruding portion 430 and the second protruding portion 530 may be spaced apart from the fixing member 600.

Referring to FIG. 11, when power is applied to the driving unit 200 and the main gear 210 is rotated in the other direction (one direction and an opposite direction of the main gear 210), the connection gear 310, engaged with the main gear 210, is rotated in the other direction (e.g., clockwise).

The first sub-gear 320 and the second sub-gear 330, engaged with the connection gear 310, are respectively rotated in an opposite direction to the connection gear 310 (e.g., counterclockwise).

In addition, the third sub-gear 340, engaged with the second sub-gear 330, is rotated in an opposite direction (e.g., clockwise) to the second sub-gear 330.

Since the first sub-gear 320 is connected to the first camera 400 and the third sub-gear 340 is connected to the second camera 500, the first camera 400 and the second camera 500 are rotated in opposite directions.

For example, the first camera 400 is rotated counterclockwise, and the second camera 500 is rotated clockwise.

Therefore, the first camera 400 and the second camera 500 may be rotated so that a first optical axis O1 and a second optical axis O2 intersect in a direction, away from a subject. Accordingly, it is possible to expand an imaging range through the two cameras.

When the main gear 210 is rotated in the other direction, the first camera 400 and the second camera 500 is relatively rotated with respect to the base member 100, respectively, and the base member 100 is slidably moved with respect to a fixing member 600. For example, a position of the base member 100 is changed before and after the main gear 210 is rotated in the other direction. In an example, the position of the base member 100 after the main gear 210 is rotated in the other direction is closer to a subject than the position of the base member 100 before the main gear 210 is rotated in the other direction.

Accordingly, the position of the base member 100 when the main gear 210 is rotated in one direction is different from the position of the base member 100 when the main gear 210 is rotated in the other direction.

When the first camera 400 is rotated counterclockwise and the second camera 500 is rotated clockwise, a first protruding portion 430 and a second protruding portion 530 are in contact with the fixing member 600, respectively.

That is, the first protruding portion 430 and the second protruding portion 530 serve to support each camera when the first camera 400 rotates counterclockwise and the second camera 500 rotates clockwise.

The first protruding portion 430 may be disposed at an outer end of a lower surface of the first camera 400 in a direction, away from a gear structure 300, and the second protruding portion 530 may be disposed at an outer end of a lower surface of a second camera 500 in a direction, away from the gear structure 300.

The camera module 10 according to the various examples may adjust an imaging range by a plurality of cameras.

Accordingly, it is possible to measure a distance from a subject, to image a stereoscopic image (or an image), and the like, and to image the subject at various depths.

As set forth above, according to the various examples, a camera module may image a subject in various manners by changing positions of a plurality of cameras.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a fixing member;
a base member slidably coupled to the fixing member;
a driving unit coupled to the base member and comprising a main gear;
a gear structure rotatably coupled to the base member and configured to engage with the main gear;
a first camera connected to the gear structure and configured to be rotated; and
a second camera connected to the gear structure and configured to be rotated in a direction opposite to the first camera,
wherein a first position of the base member when the main gear is rotated in a first rotation direction is different from a second position of the base member when the main gear is rotated in a second rotation direction that is opposite to the first rotation direction,
wherein, when the main gear is rotated in the first rotation direction, the base member is configured to maintain a fixed state with respect to the fixing member, and
wherein, when the main gear is rotated in the second rotation direction, the base member is configured to be slidably moved with respect to the fixing member.

2. The camera module of claim 1, wherein, when the main gear is rotated in the first rotation direction, the first camera and the second camera are each configured to be relatively rotated with respect to the base member, and
wherein, when the main gear is rotated in the second rotation direction, the first camera and the second camera are each configured to be relatively rotated with respect to the base member, and the base member is configured to be slidably moved with respect to the fixing member.

3. The camera module of claim 1, wherein the fixing member comprises a first support member extending to face a lower surface of the first camera and a second support member extending to face a lower surface of the second camera,
wherein a first protruding portion protruding toward the first support member is disposed on the lower surface of the first camera, and
a second protruding portion protruding toward the second support member is disposed on the lower surface of the second camera.

4. The camera module of claim 3, wherein, when the main gear is rotated in the first rotation direction, the first protruding portion and the second protruding portion are respectively moved in a direction away from the fixing member, and
wherein, when the main gear is rotated in the second rotation direction, the first protruding portion and the second protruding portion are in contact with the fixing member.

5. The camera module of claim 4, further comprising:
an elastic member having a first end connected to the base member and a second end connected to the fixing member,
wherein, when the main gear is rotated in the second rotation direction, the elastic member is elastically deformed.

6. The camera module of claim 3, wherein the first protruding portion and the second protruding portion each have a convex curved surface.

7. The camera module of claim 3, wherein the first protruding portion is disposed at an outer end of the lower surface of the first camera in a direction away from the gear structure, and
the second protruding portion is disposed at an outer end of the lower surface of the second camera in a direction away from the gear structure.

8. The camera module of claim 1, wherein the base member comprises a guide groove, and the fixing member comprises a guide protrusion configured to be inserted into the guide groove.

9. The camera module of claim 1, wherein the gear structure comprises a connection gear, a first sub-gear, a second sub-gear, and a third sub-gear, and
wherein the connection gear is engaged with the main gear, the first sub-gear and the second sub-gear are engaged with the connection gear, and the third sub-gear is engaged with the second sub-gear.

10. The camera module of claim 1, wherein the gear structure comprises a connection gear, which is engaged with the main gear, and a first sub-gear, a second sub-gear, and a third sub-gear, which are each engaged with the connection gear directly or indirectly,
wherein a rotational direction of the connection gear and a rotational direction of the first sub-gear and the second sub-gear are opposite to each other, and
wherein the rotational direction of the connection gear and a rotational direction of the third sub-gear are the same.

11. The camera module of claim 10, wherein the first camera is connected to the first sub-gear, and the second camera is connected to the third sub-gear.

12. The camera module of claim 1, wherein, when the main gear is rotated in the first rotation direction, the first camera and the second camera are rotated so that an optical axis of the first camera and an optical axis of the second camera intersect each other in a direction toward a subject.

13. The camera module of claim 12, wherein, when the main gear is rotated in the second rotation direction, the first camera and the second camera are rotated so that the optical axis of the first camera and the optical axis of the second camera intersect each other in a direction away from the subject.

14. A camera module, comprising:
a fixing member;

a base member slidably coupled to the fixing member;
a driving unit coupled to the base member and comprising a main gear;
a gear structure rotatably coupled to the base member and configured to engage with the main gear;
a first camera connected to the gear structure and configured to be rotated; and
a second camera connected to the gear structure and configured to be rotated in a direction opposite to the first camera,
wherein a first position of the base member when the main gear is rotated in a first rotation direction is different from a second position of the base member when the main gear is rotated in a second rotation direction that is opposite to the first rotation direction,
wherein, when the main gear is rotated in the first rotation direction, the first camera and the second camera are each configured to be relatively rotated with respect to the base member, and
wherein, when the main gear is rotated in the second rotation direction, the first camera and the second camera are each configured to be relatively rotated with respect to the base member, and the base member is configured to be slidably moved with respect to the fixing member.

15. A camera module, comprising:
a fixing member;
a base member slidably coupled to the fixing member;
a driving unit coupled to the base member and comprising a main gear;
a gear structure rotatably coupled to the base member and configured to engage with the main gear;
a first camera connected to the gear structure and configured to be rotated; and
a second camera connected to the gear structure and configured to be rotated in a direction opposite to the first camera,
wherein a first position of the base member when the main gear is rotated in a first rotation direction is different from a second position of the base member when the main gear is rotated in a second rotation direction that is opposite to the first rotation direction,
wherein the gear structure comprises a connection gear, a first sub-gear, a second sub-gear, and a third sub-gear, and
wherein the connection gear is engaged with the main gear, the first sub-gear and the second sub-gear are engaged with the connection gear, and the third sub-gear is engaged with the second sub-gear.

* * * * *